United States Patent [19]

Storandt

[11] 3,974,821

[45] Aug. 17, 1976

[54] CHARCOAL FIRE STARTER AND COOKER

[76] Inventor: Duane L. Storandt, 12 Hanley Downs, St. Louis, Mo. 63117

[22] Filed: Nov. 8, 1974

[21] Appl. No.: 523,042

Related U.S. Application Data

[63] Continuation-in-part of Ser. No. 340,257, March 12, 1973, Pat. No. 3,848,577.

[52] U.S. Cl. ............................ 126/25 B; 126/9 B; 126/25 R; 220/86; 294/27 H; 294/33
[51] Int. Cl.² ..................... A47J 37/07; F24B 3/00
[58] Field of Search ................ 126/25 B, 9 B, 25 R, 126/25 A, 59.5, 25 C, 218, 373; 110/1 F; 16/114 R, 120; 294/27, 33; 220/92, 94, 95, 96; 224/45 P, 45 W

[56] References Cited
UNITED STATES PATENTS

| 246,001 | 8/1881 | Garrett | 220/96 X |
|---|---|---|---|
| 1,919,407 | 7/1933 | Wood | 126/9 B |
| 2,237,081 | 4/1941 | Owens | 126/25 R |
| 2,858,641 | 11/1958 | Trimble | 220/96 X |
| 3,124,266 | 3/1964 | Morgan | 220/96 X |
| 3,167,040 | 1/1965 | Byars, Sr. et al. | 110/1 F |
| 3,330,266 | 7/1967 | Stephen | 126/25 R |
| 3,765,397 | 10/1973 | Henderson | 126/9 R X |

*Primary Examiner*—William F. O'Dea
*Assistant Examiner*—Harold Joyce
*Attorney, Agent, or Firm*—Robert J. Eck

[57] ABSTRACT

A charcoal fire starter and cooker incorporating an open ended tubular body which is divided by a perforate grate into a charcoal chamber and a combustion chamber; therebeing vents in the body for developing a flue effect to concentrate maximum heat intensity in the vicinity of the charcoal chamber. A pair of closures are telescopically received over opposite end portions of the tubular body, each closure incorporating a flat cooking surface and a skirt formed with vents adapted for adjustable registration with the tubular body vents for developing a cooker in operation. Detachable handles are provided for ready insertion within and removal from the body and closures with the body handles being adapted for supporting an auxiliary grill in usage.

3 Claims, 5 Drawing Figures

FIG.1

U.S. Patent   Aug. 17, 1976   3,974,821
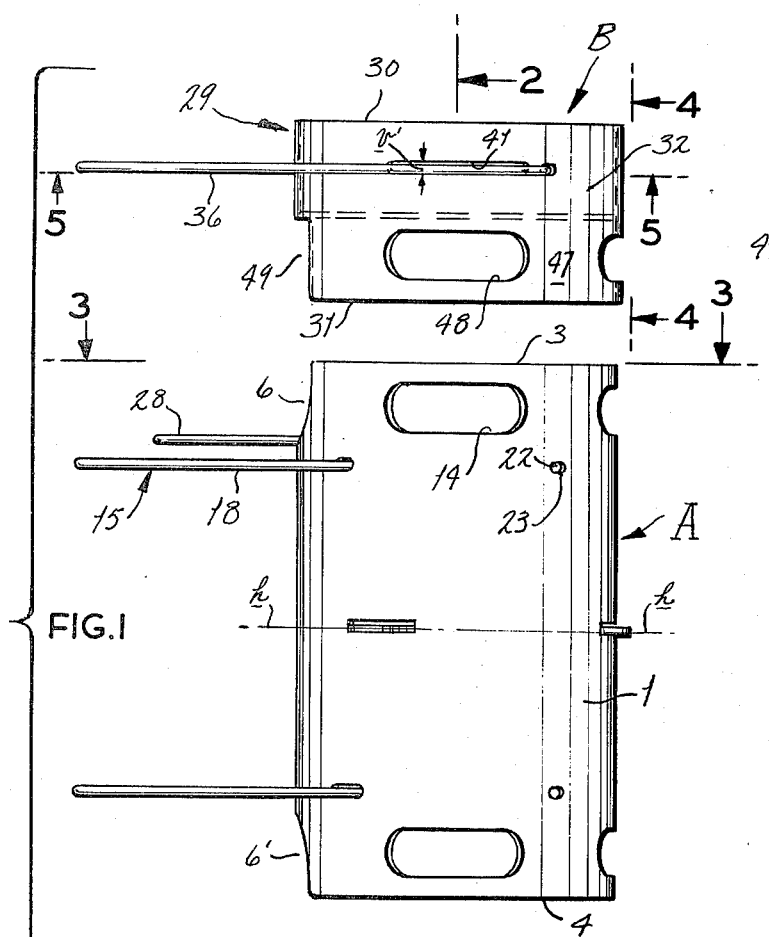
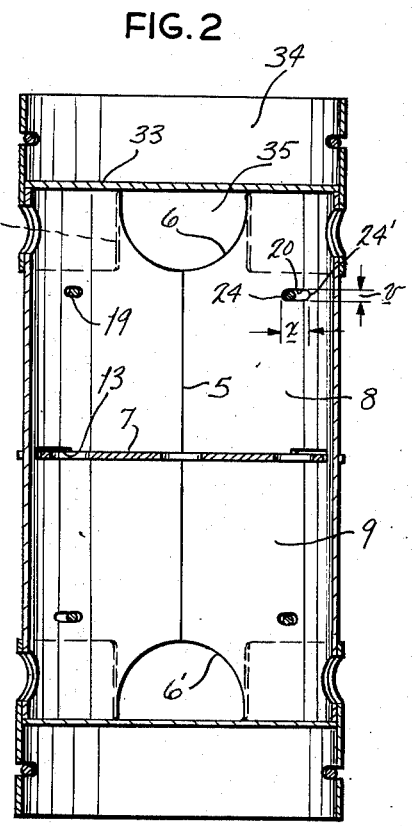
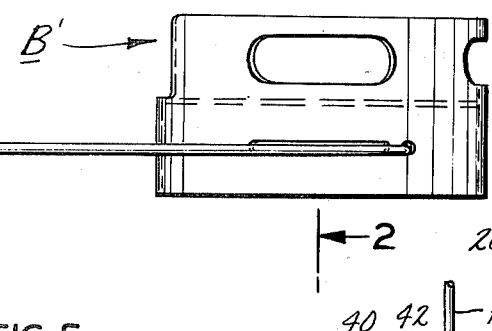
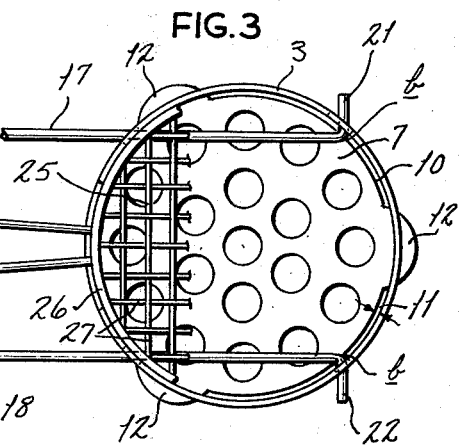
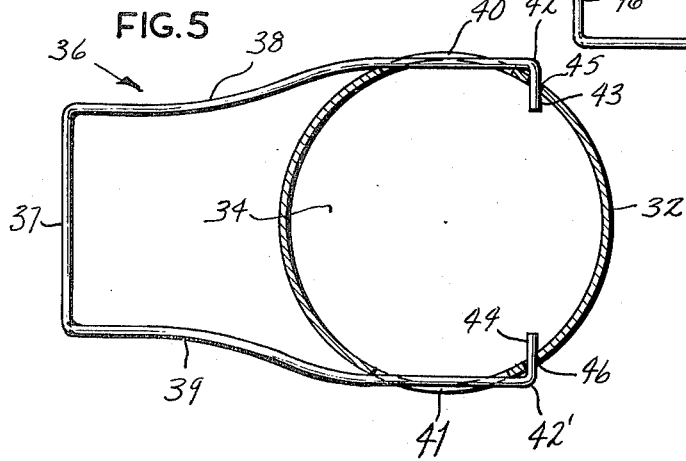
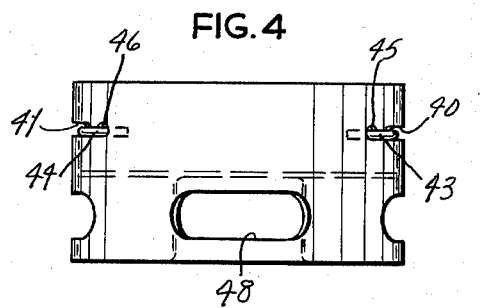

CHARCOAL FIRE STARTER AND COOKER

The present invention is a continuation-in-part of my copending application for Charcoal Fire Starter and Grill, Ser. No. 340,257, now U.S. Pat. No. 3,848,577 filed Mar. 12, 1973.

BACKGROUND AND SUMMARY OF THE INVENTION

The present invention relates in general to fuel ignition, and more particularly, to a charcoal fire starter and cooker.

Heretofore, various expedients have been utilized to assist charcoal ignition for outdoor barbecue cooking. The most commonly accepted practice is to saturate charcoal briquettes with a highly inflammable liquid, referred to as starter fluid, and then to apply a lighted match thereto. Normally, the saturated charcoal would burst into flames frequently burning the operator.

Using the starter fluid required a relatively long period of time for ignition, sometimes taking 45–60 minutes, and even longer when the charcoal was wet or damp. In an effort to hasten the ignition of the charcoal, an operator sometimes would spray additional starter fluid on the hot coals generatfire flare up and/or explosions of the fluid container yielding severe burns and sometimes death. In addition to the dangerous feature of the highly inflammable fluid, the saturation of the charcoal oftentimes transferred the offensive smell and taste of the starter fluid onto the food item being prepared.

More recently, charcoal starters of the electrical type have been used. These charcoal starters also have been lacking as the charcoal ignition has been uneven and also time consuming.

The present invention comprises a tubular body having a perforated grate which divides the body into a charcoal chamber and a combustion chamber. Received within the combustion chamber is an easily available and inexpensive combustible material, such as newspaper, wood chips or the like. Upon igniting the combustible material, the tubular body is vented for developing a flue effect wherein the fire in the combustion chamber is pulled upwardly for concentrating intense heat on the charcoal placed within the charcoal chamber. Experiments have shown that, by the present invention, charcoal is ignited for barbecuing within approximately 5–10 minutes depending, of course, on the volume of charcoal. Thus, the time for charcoal ignition is substantially reduced and the danger formerly associated with the highly volatile starter fluid is eliminated.

The present invention contemplates the provision of an auxiliary grill which is easily inserted within the upper chamber for support on the legs of the handle. By this feature, the charcoal fire starter is converted into a camper's grill or stove readily accommodating various food items for cooking in the outdoors.

The present invention also comprises identical, reversible closures, each having a skirt with vents adapted for telescopic reception over opposite end portions of the tubular body for cooperation therewith to develop a cooking chamber or oven therein. In addition to forming a cooker, the closures may serve as a skillet for frying eggs, bacon, franks or other food items customarily utilized on camping trips. The cooking chamber may also double as a storage compartment for food, utensils, camping equipment and the like before and after usage.

The charcoal fire starter and cooker of the present invention is relatively simple in construction being inexpensive to manufacture but completely reliable in usage. Moreover, the charcoal fire starter and cooker incorporates novel detachable handles which may be easily inserted and removed for facile shipping and storage, but which are also sturdy and safe in usage. Once the handles are in locked position, they cannot be accidentally dislodged no matter how rough the charcoal fire starter and cooker is handled in usage.

The charcoal fire starter and cooker is divided into equal volumes which are reversible wherein the charcoal chamber on one occasion may become the combustion chamber on another; and vice versa. Similarly, the closures are reversible so one closure may be a skillet on one occasion and a fuel support on another occasion. Therefore, the life of the charcoal fire starter and cooker is increased at least twofold.

BRIEF DESCRIPTION OF THE DRAWINGS

FIG. 1 is a side elevational, exploded view of a charcoal fire starter and cooker constructed in accordance with and embodying the present invention illustrating the closures in detached position.

FIG. 2 is a vertical section taken on the line 2—2 of FIG. 1 illustrating the closures in attached position.

FIG. 3 is a fragmentary top plan view taken on the line 3—3 of FIG. 1.

FIG. 4 is an end view taken on the line 4—4 of FIG. 1.

FIG. 5 is a horizontal section taken on the line 5—5 of FIG. 1.

DESCRIPTION OF THE PREFERRED EMBODIMENT

Referring now by reference characters to the drawings which illustrate the preferred embodiment of the present invention, A designates a charcoal fire starter comprising a body 1 which is fabricated from a single blank of incombustible metallic sheet material and rolled into tubular form, having an upper edge 3, a lower edge 4 and a pair of end edges (not shown) being fixed, as by welding, in overlapping relationship to define a seam 5. In the region of seam 5, said body 1 is cut to define upper and lower semi-arcuate recesses or cut-outs 6,6', respectively, for purposes to be described in the operation hereinbelow.

In the plane containing the transverse axis $h$—$h$, the body 1 is divided by a perforated grate 7 into an upper chamber 8 and a lower chamber 9. Said grate 7 is of substantially circular configuration having a peripheral rim 10 which is of less diameter than the inside diameter of said body 1 for defining a spacing 11 therebetween. Formed integral with said peripheral rim 10 are a plurality of circumferentially spaced-apart lugs 12 which project radially outwardly of the peripheral rim 10 for reception within complimentary slots 13 fashioned within said body 1 to support said grate 7 in operative position. No extraneous fasteners, or the like, are required to maintain the grate 7 in permanent, operative position. The preferred embodiment utilizes three lugs 12, and corresponding slots 13, which are spaced 120° apart; it being understood that more or less lugs 12 may be employed without departing from the instant invention.

Body 1 is substantially symmetrical about the transverse axis h—h, the upper half being the mirror image of the lower half. Therefore, the body 1 may be rotated 180° so that the lower edge 4 and the lower chamber 9 becomes the upper edge 3 and the upper chamber 8, respectively; and vice versa. Accordingly, only the upper half will be described, with like reference characters designating like elements in the lower half, to obviate unnecessary repetitive explanation.

Spacedly downwardly from the upper edge 3, the body 1 is formed with a plurality of circumferentially spaced-apart elongate vents, as at 14, which permit the intake of air for developing a draft in operation, as will be described. Adjacent to and spacedly downwardly of vents 14, body 1 is provided with a detachable handle 15 formed of wire stock and having a web or hand grip portion 16 and a pair of elongate legs 17, 18 which pass through handle receiving slots 19, 20 in body 1. The terminal or web remote end portion of each leg 17, 18 is outwardly bent, as at b, to develop a lug 21, 22, respectively. Each lug 21, 22 is fitted within locking apertures, as at 23, provided within the body 1.

Both handle receiving slots 19, 20 have a vertical dimension v substantially the same as the thickness of the related leg 17, 18, respectively, and a horizontal dimension greater than said vertical dimension v. The horizontal extent of handle receiving slot 19 is designed to accommodate the endwise entry of the lug 21 and facile turning of bend b of said lug 21; whereas the horizontal extent of handle receiving slot 20 is fashioned to receive the flushwise entry of the lug 22. It will be observed that when the body 1 is in tubular form, the horizontal distance x (FIG. 2) between parallel planes containing the end portions 24,24' of handle receiving slot 20 is substantially the same dimension as the length of said lug 22.

Provided for reception within upper compartment 8 is a reticulated grill 25 comprising a peripheral rim 26 and a plurality of interlaced bars 27; there being a handle 28 formed integral with said peripheral rim 26 and projecting radially outwardly through upper recess 6. The outside diameter of rim 26 is slightly less than the inside diameter of body 1 thereby conducing to facile insertion and removal along with a snug fit for preventing undesirable shifting in usage. Said grill 25 is supported by the legs 17 and 18 of the handle 15 (FIG. 3) within chamber 8. Therefore, the novel handle 15 of the present invention alleviates the need for auxiliary supports, or like structure, for the grill 25.

CLOSURES

Provided for attachment to body 1 are a pair of closures B,B', respectively, which closures B,B' are identical in construction so that only the closure B will be described; it being understood that like reference characters will designate like structure of the closure B'.

Closure B comprises a body 29 being fabricated from the same incombustible, metallic sheet material as body 1, having an upper edge 30, a lower edge 31 and an intervening, connecting panel 32. Said body 29 is formed integrally with a horizontally presented plate 33 which divides the body 29 into open-ended compartments 34,35, respectively.

Spacedly upwardly from plate 33 the body 29 is provided with a detachable handle 36 formed of wire stock and having a web or hand grip portion 37 and a pair of elongate legs 38, 39, which are received within elongate, arcuate slots 40, 41, respectively, formed in panel 32. The terminal or web remote end portion of each leg 38, 39 is inwardly bent, as at 42,42' to develop a lug 43,44, respectively. Each lug 43, 44 is fitted within locking apertures 45, 46 provided within panel 32. In the region of lugs 43, 44, the legs 38, 39 are spaced-apart slightly less than the diameter of compartment 34, with the space between legs 38, 39 decreasing exteriorly of closure B as said legs 38, 39 approach the hand grip portion 37. The resiliency of handle 36 is conducive to snapping the legs 38, 39 and lugs 43, 44 within the related slots 40, 41 and locking apertures 45, 46 to provide a stable but detachable connection. The vertical dimension v' of slots 40, 41 is substantially the same dimension as legs 38, 39 thereby providing a snug fit and enhancing the stability of the handle connection in usage.

Downwardly of plate 33, the panel 32 constitutes a skirt 47 formed with a plurality of elongate vents 48 being of substantially the same dimension and shape as vents 14 of body 1. Moreover, the skirt 47 is fashioned with a rectangular-shaped recess 49 which has a length and width substantially the same as the maximum corresponding dimension of the recess 6 of body 1. The skirt 47 is adapted to surroundingly receive the upper edge 3, and related structure of body 1, within compartment 35 for ultimate engagement of upper edges with the adjacent face of plate 33. Closure B is adapted for rotation about its vertical axis for adjusting the relative position of the vents 48 with the vents 14 and the recess 49 with the recess 6 between full-opened and full-occluding conditions. In this manner, all communication to the atmosphere of the chambers 8 and 9 may be regulated for controlling the ingress of air.

With closures B,B' in attached position on tubular body 1, the upper and lower chambers 8, 9 cooperate with the plates 33,33' to define a cooking chamber or oven C therein.

OPERATION

In operation, the body 1 is first positioned on its upper edge 3 and combustible material, such as wood chips, newspaper or the like, is inserted within the lower chamber 9, after which the closure B' is fitted over the body 1, receiving same into the compartment 35 until lower edge 4 abuts against the plate 33'; whereupon the body 1 is reversed for resting on the closure B'. Then charcoal, (not shown) such as the briquettes, is introduced into the upper compartment 8 being supported on grate 7. The operator then ignites the combustible material contained in the lower chamber 9, as by inserting a lighted match through the aligned recess 49' and 6'. The combustion of newspaper and/or wood chips creates an intense heat in the region immediately adjacent the grate 7, the combustion of the newspaper and/or wood chips being aided by the draft created by the intake of air through the registered vents 14' and 48' and recesses 6' and 49', which air moves upwardly through the perforated grate 7 and the spacing 11 thereof to pull the fire upwardly for igniting the charcoal. If additional newspaper or wood chips are required, they may be easily inserted within the lower chamber 9 by insertion through recesses 6' and 48'. The intense heat developed in the lower chamber 9 ignites the charcoal in the upper chamber 8 in a relatively short period of time. After the charcoal is ignited to satisfaction, the operator then places the grill 25 within the upper chamber 8 for support on the legs 17 and 18 of handle 15 (FIG. 4). In operative position, food items, such as frankfurters, hamburgers, chops or small steaks, may be placed on the grill for ready cooking.

To use the described structure as a cooker, the operator places closure B over body 1, receiving same within compartment 35 until the upper edge 3 abuts against the plate 33. Closure B is rotated about its vertical axis to adjust the relative position of the recesses 6 and 49 and vents 14 and 48 into desired position. The smaller the opening developed by the related vents 14 and 48, the larger the temperature within the cooking chamber C. Accordingly, by adjusting the vents 14 and 48, and 14' and 48' of closures B and B', respectively, the temperature within the cooking chamber C can be controlled.

The plate 33 of closure B may also serve as a skillet for frying eggs, bacon or other similar food items that are not normally cooked on an open grill. Accordingly, while food is cooking within cooking chamber C, additional food items may be fried on the plate 33. Since the closures B and B' may be used interchangeably, the over all life of same is augmented considerably.

Having thus described my invention, what I claim and desire to obtain by Letters Patent is:

1. In a charcoal fire starter having a body with open ends, said body having vents adjacent said open ends; a grate carried by said body and dividing same into a fuel chamber and a fuel ignition chamber; and body handle means for manipulating said body; the improvement comprising:

closure means receivable over at least one open end of said body;

handle means carried by said closure means;

said closure means comprising:

a closure body having a first edge and a second edge;

a panel connecting said first and second edges;

a plate carried by said closure body dividing same into first and second compartments;

one of said compartments receiving an open end of said body;

means defining diametrically opposed elongate arcuate slots in said panel and a locking aperture presented spacedly from each slot;

said handle means of said closure means comprising:

a web;

a pair of elongate legs received within said arcuate slots; and a pair of lugs bent inwardly of said elongate legs and adapted for reception within the related locking apertures.

2. The invention as described in claim 1 and further characterized by:

said elongate slots and said locking apertures being located in the panel defining the other of said compartments.

3. The invention as described in claim 1 and further characterized by:

said elongate legs having a spacing therebetween;

said spacing being less than the distance between the centers of said arcuate slots;

said spacing between said elongate legs gradually decreasing in the region between the said closure means and said web.

* * * * *